United States Patent
Durali et al.

(10) Patent No.: US 9,434,837 B2
(45) Date of Patent: Sep. 6, 2016

(54) METHOD OF PRODUCING FLUOROPOLYMERS USING ACID-FUNCTIONALIZED MONOMERS

(75) Inventors: Mehdi Durali, Carlsbad, CA (US); Lotfi Hedhli, Noisy le Roi (FR)

(73) Assignee: Arkema Inc., King of Prussia, PA (US)

( * ) Notice: Subject to any disclaimer, the term of this patent is extended or adjusted under 35 U.S.C. 154(b) by 124 days.

(21) Appl. No.: 13/816,498

(22) PCT Filed: Aug. 30, 2011

(86) PCT No.: PCT/US2011/049669
§ 371 (c)(1),
(2), (4) Date: Feb. 12, 2013

(87) PCT Pub. No.: WO2012/030784
PCT Pub. Date: Mar. 8, 2012

(65) Prior Publication Data
US 2013/0150519 A1 Jun. 13, 2013

Related U.S. Application Data

(60) Provisional application No. 61/379,005, filed on Sep. 1, 2010.

(51) Int. Cl.
*C08F 14/22* (2006.01)
*C08F 214/22* (2006.01)
*C08L 27/16* (2006.01)
*C08F 14/08* (2006.01)

(52) U.S. Cl.
CPC .............. *C08L 27/16* (2013.01); *C08F 14/08* (2013.01); *C08F 14/22* (2013.01); *C08F 214/22* (2013.01); *C08F 214/225* (2013.01)

(58) Field of Classification Search
CPC .............. C08F 214/22; C08F 214/245; C08F 214/225
See application file for complete search history.

(56) References Cited

U.S. PATENT DOCUMENTS

| 2,460,573 | A | | 2/1949 | Folt | |
|---|---|---|---|---|---|
| 3,249,595 | A | | 5/1966 | Lederer et al. | |
| 4,524,197 | A | | 6/1985 | Khan | |
| 4,668,749 | A | * | 5/1987 | Graun et al. | 526/245 |
| 5,763,552 | A | | 6/1998 | Feiring et al. | |
| 5,804,650 | A | * | 9/1998 | Tsuda et al. | 524/805 |
| 5,912,294 | A | | 6/1999 | Schade | |
| 5,925,705 | A | | 7/1999 | Araki et al. | |
| 5,955,556 | A | * | 9/1999 | McCarthy et al. | 526/249 |
| 6,255,384 | B1 | | 7/2001 | McCarthy et al. | |
| 6,365,684 | B1 | | 4/2002 | McCarthy et al. | |
| 6,512,063 | B2 | | 1/2003 | Tang | |
| 6,677,044 | B2 | * | 1/2004 | Araki et al. | 428/421 |
| 7,521,513 | B2 | | 4/2009 | Tang | |
| 2003/0114616 | A1 | * | 6/2003 | Ishida et al. | 526/250 |
| 2005/0096442 | A1 | | 5/2005 | Thaler et al. | |
| 2007/0032591 | A1 | | 2/2007 | Durali et al. | |
| 2008/0039599 | A1 | | 2/2008 | Du et al. | |
| 2009/0221776 | A1 | | 9/2009 | Durali et al. | |
| 2010/0036053 | A1 | * | 2/2010 | Aten et al. | 524/805 |
| 2010/0036073 | A1 | * | 2/2010 | Aten et al. | 526/247 |
| 2010/0197852 | A1 | | 8/2010 | Tsuda et al. | |

FOREIGN PATENT DOCUMENTS

| GB | 823974 A | * | 11/1959 |
|---|---|---|---|
| GB | 1213171 A | * | 11/1970 |
| JP | 2508098 B2 | * | 6/1996 |
| WO | WO 2010/005756 A1 | | 1/2010 |

OTHER PUBLICATIONS

Machine translation of JP 2508098 B2, Jan. 2015.*

* cited by examiner

Primary Examiner — Nicole M Buie-Hatcher
(74) Attorney, Agent, or Firm — Thomas F. Roland

(57) ABSTRACT

A fluoropolymer latex is obtained by emulsion polymerization of one or more fluoromonomers in the presence of one or more acid-functionalized monomers such as vinyl sulfonic acid or a salt thereof. A fluorosurfactant need not be present.

13 Claims, No Drawings

METHOD OF PRODUCING FLUOROPOLYMERS USING ACID-FUNCTIONALIZED MONOMERS

This application claims benefit, under U.S.C. §371 of PCT Application Number PCT/US2011/49669, filed Aug. 30, 2011, and U.S.C. §119 of U.S. Provisional Application No. 61/379,005, filed Sep. 1, 2010.

FIELD OF THE INVENTION

The invention relates to methods of polymerizing fluoromonomers, in particular to emulsion polymerization methods providing a fluoropolymer latex.

BACKGROUND OF THE RELATED ART

Known processes for making fluoropolymers by an emulsion process commonly use perfluorinated or highly fluorinated surfactants to stabilize the emulsion during the reaction. For example, perfluorocarboxylate salts are used to stabilize fluoropolymer emulsion polymerizations, with the most common example being ammonium perfluorooctanoate. The high degree of fluorination of such surfactants avoids atom transfer between a growing polymer chain and the surfactant during polymerization, which would result in lowered molecular weights in the product and likely inhibition of the reaction. The fluorosurfactants are expensive, specialized materials, however, and because of their high stability, they tend to persist in the environment. A process which uses a nonfluorinated surfactant to make fluoropolymers would therefore be advantageous. While nonfluorinated surfactants have been used in the art to carry out emulsion polymerization of other monomers, they have been rarely used in fluoropolymer synthesis due to the problems cited above.

BRIEF SUMMARY OF THE INVENTION

The present invention provides a process for preparing a fluoropolymer in an aqueous reaction medium, comprising:
a) forming an aqueous emulsion comprising at least one radical initiator, at least one acid-functionalized monomer or salt thereof, and at least one fluoromonomer, and
b) initiating polymerization of said at least one fluoromonomer.

It has unexpectedly been discovered that the presence of an acid-functionalized monomer during free radical-catalyzed emulsion polymerization of a fluoromonomer permits the amount of fluorosurfactant usually necessary to achieve satisfactory polymerization results to be significantly reduced or even eliminated altogether. Such results were surprising in view of the expectation that such acid-functionalized monomers, which contain carbon-carbon double bonds, would act as chain transfer agents (undesirably lowering the molecular weight of the fluoropolymer obtained) or inhibit or retard the fluoromonomer polymerization. Moreover, such acid-functionalized monomers are not recognized as having surfactant properties; the ability to in effect substitute such compounds for the surfactants conventionally used in fluoromonomer polymerization was therefore unexpected.

DETAILED DESCRIPTION OF CERTAIN EMBODIMENTS OF THE INVENTION

A polymerization reaction in accordance with the present invention may be carried out by charging a reactor with water (preferably deionized water), at least one acid-functionalized monomer, at least one fluoromonomer and optionally, one or more of a surfactant, a chain-transfer agent and/or an antifoulant. Air may be purged from the reactor prior to the introduction of the fluoromonomer. Water is added to the reactor before bringing the reactor to the desired starting temperature, but the other materials may be added before or after bringing the reactor to temperature. At least one radical initiator is added to start and maintain the polymerization reaction. Additional monomer may be optionally added to replenish monomer that is consumed, and the other materials may be optionally added during the course of the polymerization to maintain the reaction and control the final product properties.

Acid-Functionalized Monomer

The term "acid-functionalized monomer" means a type of molecule which contains one or more acidic groups (in free acid or salt form) and one or more ethylenically unsaturated groups (in particular, vinylic groups) in its main structure. Example of such acid-functionalized monomers include, but are not limited to: acrylic acid, methacrylic acid, vinyl sulfonic acid, vinyl phosphonic acid, and itaconic acid and salts of such compounds.

Representative acid-functionalized monomers suitable for use in the invention include, but are not limited to, compounds having the following structures:

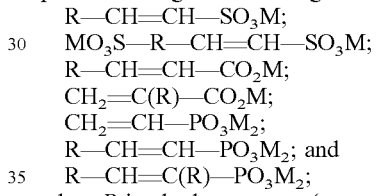

where R is a hydrogen atom (except in the case of the second compound listed) or a hydrocarbon portion, and where M is a monovalent cation selected from the group consisting of hydrogen ion, alkali metal ions, ammonium ion, and monoalkyl, dialkyl, trialkyl, and tetraalkyl ammonium ions, with the alkyl parts of the monoalkyl, dialkyl, trialkyl, or tetraalkyl ammonium ion each having one to four carbon atoms. The hydrocarbon portion may be linear or branched, may be aliphatic or aromatic or both aliphatic and aromatic, may contain heteroatoms such as oxygen, sulfur, nitrogen, and may be saturated or contain one or more unsaturated bonds.

The acid-functionalized monomers may be used as mixtures with one another. Preferred acid-functionalized monomers are in salt form. Especially preferred acid-functionalized monomers are the ammonium or sodium salts.

The acid-functionalized monomers may be used in an amount, for example, of from about 0.01 to about 1 weight percent based on total monomer. Preferably they are used in an amount from about 0.01 to about 0.5 weight percent based on total monomer. In various embodiments, the total amount of acid-functionalized monomer(s) is at least 0.01, at least 0.02, at least 0.03, at least 0.04 or at least 0.05 weight percent based on total monomer. In other embodiments, the total amount of acid-functionalized monomer(s) does not exceed 1.0, 0.8, 0.6, 0.5, 0.4, 0.3 or 0.2 weight percent based on total monomer. The acid-functionalized monomers may be used in solution such as in aqueous solution for convenient handling.

Surfactants can also be used in combination with acid-functionalized monomers to provide further stability to the polymer emulsion. Preferred surfactants are non-fluorinated hydrocarbon surfactants, siloxane surfactants or a combination thereof. For example the acid-functionalized monomer(s) can be used in combination with sodium dodecyl benzene sulfonate (SDDBS), sodium octyl sulfonate, sodium lauryl sulfate, ammonium lauryl sulfate, and sodium laureth sulfate, among others. In certain embodiments of the invention, no fluorosurfactant is present in the aqueous emulsion and/or no fluorosurfactant is introduced during polymerization of the fluoromonomer(s).

Polycaprolactones (PCL) or salts thereof can also be used in combination with acid-functionalized monomers in the process of the present invention. In such embodiments, the polycaprolactone (which may be a homopolymer of caprolactone or a copolymer of caprolactone and at least one other monomer) may be present in an amount from about 0.001 to about 2.0 weight percent based on total monomer. See, for example, WO 2009/126504, incorporated herein by reference in its entirety for all purposes.

Fluoromonomers

The term "fluoromonomer" or the expression "fluorinated monomer" means a polymerizable alkene which contains at least one fluorine atom, fluoroalkyl group, or fluoroalkoxy group attached to a carbon atom which is part of the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The thermoplastic polymers typically exhibit a crystalline melting point. The fluoropolymer in certain embodiments of the invention contains at least 50 mole percent of one or more fluoromonomers, in polymerized form.

Fluoromonomers useful in the practice of the invention include, for example, vinylidene fluoride (VDF or $VF_2$), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2,3,3,3-tetrafluoropropene, fluorinated vinyl ethers, fluorinated allyl ethers, fluorinated dioxoles, and combinations thereof.

Especially preferred copolymers made by the process of the invention are copolymers of VDF with HFP, TFE or CTFE, comprising from about 50 to about 99 weight percent VDF, more preferably from about 70 to about 99 weight percent VDF.

Especially preferred terpolymers are the terpolymer of VDF, HFP and TFE, and the terpolymer of VDF, trifluoroethene, and TFE. The especially preferred terpolymers have at least 10 weight percent VDF; the other comonomers may be present in varying proportions, but together they comprise up to 90 weight percent of the terpolymer.

Initiators

The term "initiator" and the expressions "radical initiator" and "free radical initiator" refer to a chemical that is capable of providing a source of free radicals, either induced spontaneously, or by exposure to heat or light. Examples of suitable initiators include peroxides, peroxydicarbonates and azo compounds. "Initiators" also includes redox systems useful in providing a source of free radicals. The term "radical" and the expression "free radical" refer to a chemical species that contains at least one unpaired electron.

The radical initiator is added to the reaction mixture in an amount sufficient to initiate and maintain the polymerization reaction at a desired reaction rate. The order of addition may vary according to the desired process and latex emulsion characteristics.

The radical initiator may comprise a persulfate salt, such as sodium persulfate, potassium persulfate, or ammonium persulfate. The amount of persulfate salt added to the reaction mixture (based upon the total weight of monomer added to the reaction mixture) may, for example, be from about 0.002 to about 1.0 weight percent.

The radical initiator may comprise an organic peroxide such as an alkyl, dialkyl, or diacyl peroxide, peroxydicarbonates, and peroxy esters or mixtures thereof. A preferred dialkyl peroxide is di-tert-butylperoxide (DTBP), which may be added to the reaction mixture in an amount from about 0.01 to about 5 weight percent on total monomer, and is preferably added in an amount from about 0.05 to about 2.5 weight percent on total monomer. Preferred peroxydicarbonate initiators are di-n-propyl peroxydicarbonate and diisopropyl peroxydicarbonate, which may be added to the reaction mixture in an amount from about 0.5 to about 2.5 weight percent on total monomer. Peroxy ester initiators include tert-amyl peroxypivalate, tertbutyl peroxypivalate, and succinic acid peroxide.

The radical initiator may comprise an azo initiator, such as 2,2'-azobis(2-methylpropionamidine)dihydrochloride.

The radical initiator may comprise a redox system. By "redox system" is meant a system comprising an oxidizing agent, a reducing agent and optionally, a promoter as an electron transfer medium. Oxidizing agents include, for example, persulfate salts; peroxides, such as hydrogen peroxide; hydroperoxides such as tertbutyl hydroperoxide and cumene hydroperoxide; and oxidizing metal salts such as, for example, ferric sulfate. Reducing agents include, for example, sodium formaldehyde sulfoxylate, sodium and potassium sulfite, ascorbic acid, bisulfite, metabisulfite, and reduced metal salts. The promoter is a component of the redox system which, in different oxidation states, is capable of reacting with both the oxidant and the reducing agent, thereby accelerating the overall reaction. Promoters include, for example, transition metal salts such as ferrous sulfate. In redox systems, the oxidizing agent and the reducing agent may be utilized in an amount from about 0.01 to about 0.5 weight percent on total monomer. The optional promoter may be utilized in an amount from about 0.005 to about 0.025 weight percent on total monomer. Redox systems are described in G. S. Misra and U. D. N. Bajpai, *Prog. Polym. Sci.*, 1982, 8(1-2), pp. 61-131.

Chain-Transfer Agents

Chain-transfer agents are added to the polymerization to regulate the molecular weight of the product. They may be added to a polymerization in a single portion at the beginning of the reaction, or incrementally or continuously throughout the reaction. The amount and mode of addition of chain-transfer agent depend on the activity of the particular chain transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture.

Oxygenated compounds such as alcohols, carbonates, ketones, esters, and ethers may serve as chain-transfer agents. Examples of oxygenated compounds useful as chain-transfer agents include isopropyl alcohol, as described in U.S. Pat. No. 4,360,652. Other classes of compounds which may serve as chain-transfer agents in the polymerization of halogen-containing monomers include, for example, halocarbons and hydrohalocarbons, such as chlorocarbons. Alkanes such as ethane and propane may also function as chain-transfer agents.

Buffering Agent

The polymerization reaction mixture may optionally contain a buffering agent to maintain a controlled pH throughout the polymerization reaction. The pH is preferably controlled within the range of from about 4 to about 8, to minimize undesirable color development in the product.

Buffering agents may comprise an organic or inorganic acid or alkali metal salt thereof, or base or salt of such organic or inorganic acid, that has at least one $pK_a$ value and/or $pK_b$ value in the range of from about 4 to about 10, preferably from about 4.5 to about 9.5. Preferred buffering agents in the practice of the invention include, for example, phosphate buffers and acetate buffers. A "phosphate buffer" is a salt or a mixture of salts of phosphoric acid. An "acetate buffer" is a salt of acetic acid.

Buffering agents are preferably employed where potassium persulfate is employed as the radical initiator. A preferred buffering agent for use with persulfate radical initiators is sodium acetate. A preferred amount of sodium acetate buffer is from about 50 wt. % to about 150 wt. %, based on the weight of persulfate initiator added to the reaction. In one preferred embodiment, the initiator feed comprises approximately equal weights of potassium persulfate and sodium acetate in aqueous solution.

Antifoulant

The addition of a paraffin wax or hydrocarbon oil to the reaction serves as an antifoulant to minimize or prevent polymer adhesions to the reactor components. Any long chain saturated hydrocarbon wax or oil can perform this function. The amount of oil or wax added to the reactor is an amount which serves to minimize the formation of polymer adhesions on the reactor components. The amount is generally proportional to the interior surface area of the reactor and may vary from about 1 to about 40 mg per square centimeter of reactor interior surface area. The amount of paraffin wax or hydrocarbon oil is preferably about 5 mg/cm$^2$ of the reactor interior surface area.

Polymerization Conditions

The temperature used for polymerization may vary, for example, from 20-130 degrees Celsius, depending on the initiator system chosen. The polymerization temperature is preferably from 35-130 degrees Celsius, and most preferably from 65-95 degrees Celsius.

The pressure used for polymerization may vary from 280-20,000 kPa, depending on the capabilities of the reaction equipment, the initiator system chosen, and the monomer selection. The polymerization pressure is preferably from 2,000-11,000 kPa, and most preferably from 2,750-6,900 kPa.

The polymerization occurs under stirring or other agitation. The stirring/agitation may be constant, or may be varied to optimize process conditions during the course of the polymerization. In one embodiment, both multiple stirring speeds and multiple temperatures are used for controlling the reaction.

According to one embodiment of the process of the invention, a pressurized polymerization reactor equipped with a stirrer and heat control means is charged with water, preferably deionized water, one or more acid-functionalized monomers and at least one fluoromonomer. The mixture may optionally contain one or more of a surfactant, a buffering agent, an antifoulant or a chain-transfer agent for molecular weight regulation of the polymer product.

Prior to introduction of the monomer or monomers, air is preferably removed from the reactor in order to obtain an oxygen-free environment for the polymerization reaction.

The order in which the polymerization components are assembled may be varied, although it is generally preferred that at least a portion of the acid-functionalized monomer is present in the aqueous reaction medium prior to the initiation of the polymerization of the fluoromonomer. An additional amount of acid-functionalized monomer may be fed to the reactor during the reaction.

In one embodiment, water, initiator, acid-functionalized monomer and optionally surfactant, antifoulant, chain transfer agent and/or buffer are charged to the reactor, and the reactor heated to the desired reaction temperature. The fluoromonomer(s) is(are) then fed into the reactor, preferably at a rate which provides an essentially constant pressure.

Alternatively the fluoromonomer, acid-functionalized monomer and initiator can be fed to the reactor, along with one or more of the optional ingredients. Other variations for fluoropolymer polymerization processes are contemplated, as known in the art.

The monomer feed is terminated when the desired weight of monomer has been fed to the reactor. Additional radical initiator is optionally added, and the reaction is allowed to react out for a suitable amount of time. The reactor pressure drops as the monomer within the reactor is consumed.

Upon completion of the polymerization reaction, the reactor is brought to ambient temperature and the residual unreacted monomer is vented to atmospheric pressure. The aqueous reaction medium containing the fluoropolymer is then recovered from the reactor as a latex. The latex consists of a stable mixture of the reaction components, i.e., water, acid-functionalized monomer, initiator (and/or decomposition products of the initiator) and fluoropolymer solids.

Generally, the latex contains from about 10 to about 50 weight percent polymer solids. The polymer in the latex may be in the form of small particles having a size range of from about 30 nm to about 800 nm.

Product Handling

The product of the polymerization is a latex which can be used in that form, usually after filtration of solid byproducts from the polymerization process, or which can be coagulated to isolate the solids, which may then be washed and dried. For use in latex form, the latex can be stabilized by the addition of a surfactant, which may be the same as or different from the surfactant present during polymerization (if any). This later added surfactant may, for example, be an ionic or non-ionic surfactant. In one embodiment of the invention, no fluorosurfactant is added to the latex. For solid product, the latex may be coagulated mechanically or by the addition of salts or acids, and then isolated by well-known means such as by filtration. Once isolated, solid product can be purified by washing or other techniques, and it may be dried for use as a powder, which can be further processed into granules, pellets or the like.

EXAMPLES

General: Deionized water was used. Reagents were of ACS reagent grade quality unless stated otherwise.

Example 1

A vinylidene fluoride homopolymer was made using vinyl sulfonic acid, sodium salt (from Aldrich, 25% aqueous solution) as acid-functionalized monomer and potassium persulfate as initiator. Potassium persulfate (KPS) 1 wt % solution was prepared using 1.0 g of KPS (98% from Aldrich) and 99.0 g of deionized water. A 0.25 wt % vinyl sulfonic acid, sodium salt solution was prepared by adding 1.0 g of vinyl sulfonic acid, sodium salt (from Aldrich, 25% aqueous solution) into 99.0 g of deionized water.

To a 2 Liter, stainless steel reactor was added 600 g of water and 50.0 g of 0.25 wt % vinyl sulfonic acid, sodium salt solution. The mixture was purged with argon and agitated for 0.5 hours. The reactor was sealed, agitation was continued, and the reactor was heated to 83 degrees Celsius. The reactor was charged with 136 g of vinylidene fluoride. The reactor temperature stabilized at 83 degrees Celsius, with the reactor pressure at 606 psig. Then 25.8 g of the KPS initiator solution was fed to the reactor. The reaction temperature was held at 83 degrees Celsius, and the reaction pressure was maintained at 606 psig by adding vinylidene fluoride as needed. After 25 minutes, the feed of vinylidene fluoride was stopped. For a period of 20 minutes, agitation was continued and the temperature was maintained. The agitation and heating were discontinued. After cooling to room temperature, surplus gas was vented, and the reactor was emptied of latex through a stainless steel mesh. Gravimetric solids measurements of the latex showed the solids content to be 22.0 wt %. Capillary hydrofractionation (CHDF) latex particle size measurements of the latex showed the particle size to be 190 nm.

Example 2

A vinylidene fluoride homopolymer was made using vinyl sulfonic acid, sodium salt (from Aldrich, 25% aqueous solution) as acid-functionalized monomer and potassium persulfate as initiator. Potassium persulfate (KPS) 1 wt % solution was prepared using 1.0 g of KPS (98% from Aldrich) and 99.0 g of deionized water.

To a 2 Liter, stainless steel reactor was added 900 g of water and 2.6 g of 25 wt % vinyl sulfonic acid, sodium salt aqueous solution. The mixture was purged with argon and agitated for 0.5 hours. The reactor was sealed, agitation was continued, and the reactor was heated to 83 degrees Celsius. The reactor was then charged with 133 g of vinylidene fluoride. The reactor temperature stabilized at 83 degrees Celsius, with the reactor pressure at 650 psig. Then 39.0 g of the 1% KPS initiator solution was fed to the reactor. The reaction temperature was held at 83 degrees Celsius, and the reaction pressure was maintained at 606 psig by adding vinylidene fluoride as needed. After 100 minutes, the feed of vinylidene fluoride was stopped. For a period of 15 minutes, agitation was continued and the temperature was maintained. The agitation and heating were discontinued. After cooling to room temperature, surplus gas was vented, and the reactor was emptied of latex through a stainless steel mesh. Gravimetric solids measurements of the latex showed the solids content to be 32.5 wt %.

Example 3

A vinylidene fluoride (VDF) and hexafluoropropene (HFP) copolymer was made using vinyl sulfonic acid, sodium salt (from Aldrich, 25% aqueous solution) as acid-functionalized monomer and potassium persulfate as initiator.

Deionized water was used. Potassium persulfate (KPS) 1 wt % solution was prepared using 1.0 g of KPS (98% from Aldrich) and 99.0 g of deionized water. Ethyl acetate was from Aldrich and used as received. A 5 wt % ethyl acetate aqueous solution was prepared by adding 5 g of ethyl acetate into 95 g of deionized water.

To a 2 Liter, stainless steel reactor was added 800 g of water, 4.3 g of 5 wt % ethyl acetate solution and 2.4 g of 25 wt % vinyl sulfonic acid, sodium salt aqueous solution. The mixture was purged with argon and agitated for 0.5 hours. The reactor was sealed, agitation was continued, and the reactor was heated to 83 degrees Celsius. The reactor was charged with 121 g of vinylidene fluoride and 46 g of hexafluoropropene. The reactor temperature stabilized at 83 degrees Celsius, with the reactor pressure at 604 psig. Then 24.7 g of the 1% KPS initiator solution were fed to the reactor. The reaction temperature was held at 83 degrees Celsius, and the reaction pressure was maintained at 620 psig by adding vinylidene fluoride and hexafluoropropene as needed, and maintaining the VDF/HFP ratio at about 2.7. After 45 minutes, an additional 2.8 g of 1% KPS initiator solution was fed to the reactor. After 135 minutes, the feed of vinylidene fluoride and hexafluoropropene was stopped. For a period of 20 minutes, agitation was continued and the temperature was maintained. The agitation and heating were then discontinued. After cooling to room temperature, surplus gas was vented, and the reactor was emptied of latex through a stainless steel mesh. Gravimetric solids measurements of the latex showed the solids content to be 28.0 wt %.

Example 4

A vinylidene fluoride homopolymer made using vinyl sulfonic acid, sodium salt (from Aldrich, 25% aqueous solution) as acid-functionalized monomer and di-n-propyl peroxydicarbonate (NPP) as initiator. An initiator emulsion consisting of 11.0 g of NPP, 350 g water and 1.0 g of Geropon® 690 from Genesee Polymers was prepared. Deionized water was used. Ethyl acetate was from Aldrich and used as received. A 5 wt % ethyl acetate aqueous solution was prepared by adding 5 g of ethyl acetate into 95 g of deionized water.

To a 2 Liter, stainless steel reactor was added 806 g of water, 4.0 g of 5 wt % ethyl acetate solution, 3.0 g of 25 wt % vinyl sulfonic acid, sodium salt aqueous solution. The mixture was purged with argon and agitated for 0.5 hours. The reactor was sealed, agitation was continued, and the reactor was heated to 83 degrees Celsius. The reactor was charged with 159 g of vinylidene fluoride. The reactor temperature stabilized at 83 degrees Celsius, with the reactor pressure at 654 psig.

Then 30.0 g of the NPP initiator emulsion was fed to the reactor at 90 mL/hour. The reaction temperature was held at 83 degrees Celsius, and the reaction pressure was maintained at 639 psig by adding vinylidene fluoride as needed, and feeding the di-n-propyl peroxydicarbonate (NPP) initiator emulsion at an average rate of 40 mL/hour through the remainder of the reaction. After 135 minutes, the feed of vinylidene fluoride was stopped. For a period of 15 minutes, initiator addition and agitation were continued and the temperature was maintained. Initiator addition was then discontinued. After a further 15 minutes, agitation and heating were discontinued. After cooling to room temperature, surplus gas was vented, and the reactor was emptied of latex through a stainless steel mesh. Gravimetric solids measurements of the latex showed the solids content to be 28.0 wt %.

Example 5

A PVDF homopolymer was made using vinyl sulfonic acid, sodium salt (from Aldrich, 25% aqueous solution) as acid-functionalized monomer and potassium persulfate (KPS) as initiator.

To a 7.5 liter, stainless steel reactor was added 4.600 kg of water, 0.008 kg of paraffin wax, 0.400 kg of an aqueous solution consisting of 0.00293 kg of vinyl sulfonic acid sodium salt and 0.3971 kg water. The mixture was purged with argon and agitated for 0.5 hours. The reactor was sealed, agitation was continued, and the reactor was heated to 115 degrees Celsius. The reactor was charged with 0.322 kg of vinylidene fluoride and 0.018 kg of di-tertiary butyl peroxide. The reactor temperature stabilized at 115 degrees Celsius, with the reactor pressure at 4611 kPa. An initiator feed consisting of 0.374 wt. % potassium persulfate and 0.262 wt. % sodium acetate was started at 0.48 kg/hr until 0.080 Kg of initiator solution was charged into the reactor. The initiator feed rate was then reduced to 0.036 Kg/hr. The reaction temperature was held at 115 degrees Celsius, and the reaction pressure was maintained at 4480 kPa by adding vinylidene fluoride as needed. After 0.75 hours the initiator feed rate was raised to 0.060 Kg/hr and continued at the same rate throughout the run. After 3.32 hours, the feed of vinylidene fluoride was stopped. During this period 2.450 kg vinylidene fluoride had been added to the reactor. For a period of 0.50 hours, initiator feed was stopped, agitation was continued and the temperature was maintained. The agitation and heating were discontinued. After cooling to room temperature, surplus gas was vented, and the reactor was emptied of latex through a stainless steel mesh. Gravimetric solids measurements of the latex showed the solid polymer yield to be 96.20 wt % based on the total weight of the vinylidene fluoride fed to the reactor.

What is claimed is:

1. A process for preparing a fluoropolymer in an aqueous reaction medium, comprising:
   a) forming an aqueous emulsion comprising at least one radical initiator, and monomers consisting of about 0.01 to about 1 weight percent of at least one acid-functionalized monomer or salt thereof, and one or more fluoromonomers, wherein said at least one fluoromonomer comprises vinylidene fluoride; and
   b) initiating polymerization of said acid-functionalized monomers and fluoromonomers, using a free-radical initiator to form a stable latex emulsion copolymer, wherein the process uses no fluorosurfactant.

2. The process of claim 1, wherein the process uses no surfactant.
3. The process of claim 1, wherein the aqueous emulsion additionally comprises a surfactant other than a fluorosurfactant.
4. The process of claim 1, wherein said acid-functionalized monomer or salt thereof is functionalized with at least one acid group selected from the group consisting of sulfonic acid groups, phosphonic acid groups and carboxylic acid groups and salts thereof.
5. The process of claim 1, wherein said acid-functionalized monomer or salt thereof is vinyl sulfonic acid or a salt thereof.
6. The process of claim 1, wherein said acid-functionalized monomer or salt thereof is selected from the group consisting of vinyl sulfonic acid, acrylic acid, methacrylic acid, vinyl phosphonic acid, itaconic acid, and salts thereof.
7. The process of claim 1, wherein the acid-functionalized monomer or salt thereof has a structure selected from:

R—CH=CH—SO$_3$M;
MO$_3$S—R—CH=CH—SO$_3$M;
R—CH=CH—CO$_2$M;
CH$_2$=C(R)—CO$_2$M;
CH$_2$=CH—PO$_3$M$_2$;
R—CH=CH—PO$_3$M$_2$; and
R—CH=C(R)—PO$_3$M$_2$;

where R is a hydrogen atom or a hydrocarbon portion, and where M is a monovalent cation selected from the group consisting of hydrogen ion, alkali metal ions, ammonium ion, and monoalkyl, dialkyl, trialkyl, and tetraalkyl ammonium ions, with the alkyl parts of the monoalkyl, dialkyl, trialkyl, or tetraalkyl ammonium ion each having one to four carbon atoms.

8. The process of claim 1 wherein said at least one acid-functionalized monomer or salt thereof is present in a total amount from about 0.01 to about 0.5 weight percent based on total monomer.
9. The process of claim 1 wherein said at least one fluoromonomer is selected from the group consisting of vinylidene fluoride, hexafluoropropene, tetrafluoroethylene, trifluoroethylene, chlorotrifluoroethylene, 3,3,3-trifluoropropene, 2,3,3,3-tetrafluoropropene, vinyl fluoride, and combinations thereof.
10. The process of claim 1, wherein said at least one fluoromonomer comprises vinylidene fluoride and at least one comonomer selected from the group consisting of tetrafluoroethylene, trifluoroethylene, hexafluoropropene, chlorotrifluoroethylene, 3,3,3-trifluoropropene, 2,3,3,3-tetrafluoropropene, vinyl fluoride, and combinations thereof.
11. The process of claim 1, wherein polymerization is carried out at a temperature of from about 65 to about 95 degrees Celsius.
12. The process of claim 1, wherein the fluoropolymer is obtained in latex form.
13. The process of claim 1, wherein at least one buffering agent is present in the aqueous emulsion in an amount effective to provide a pH of from about 4 to about 8 throughout the polymerization.

* * * * *